April 24, 1928.
F. H. BLANDING
1,667,280
DETACHABLE HANDLE FOR DRILLS
Filed July 10, 1924
2 Sheets-Sheet 1
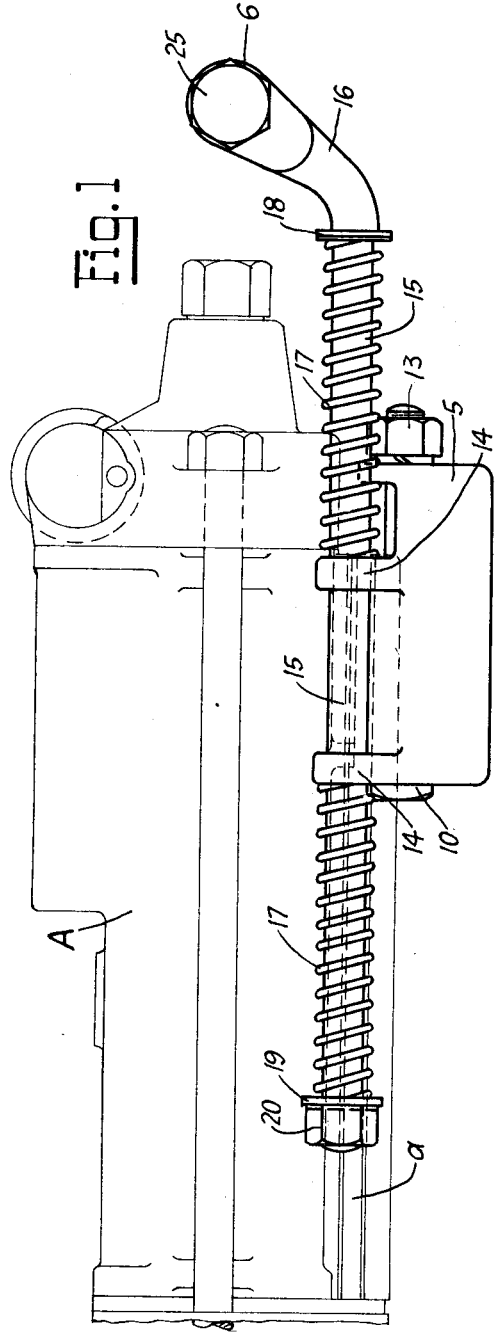
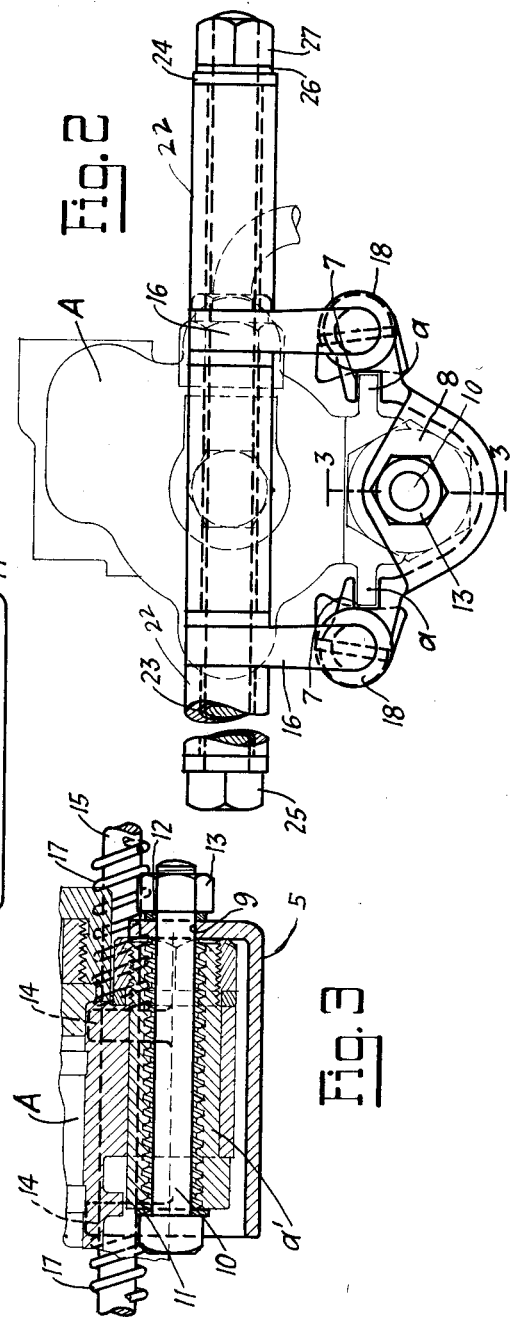
INVENTOR
Forrest H. Blanding
BY his ATTORNEY
Ira L. Nickerson

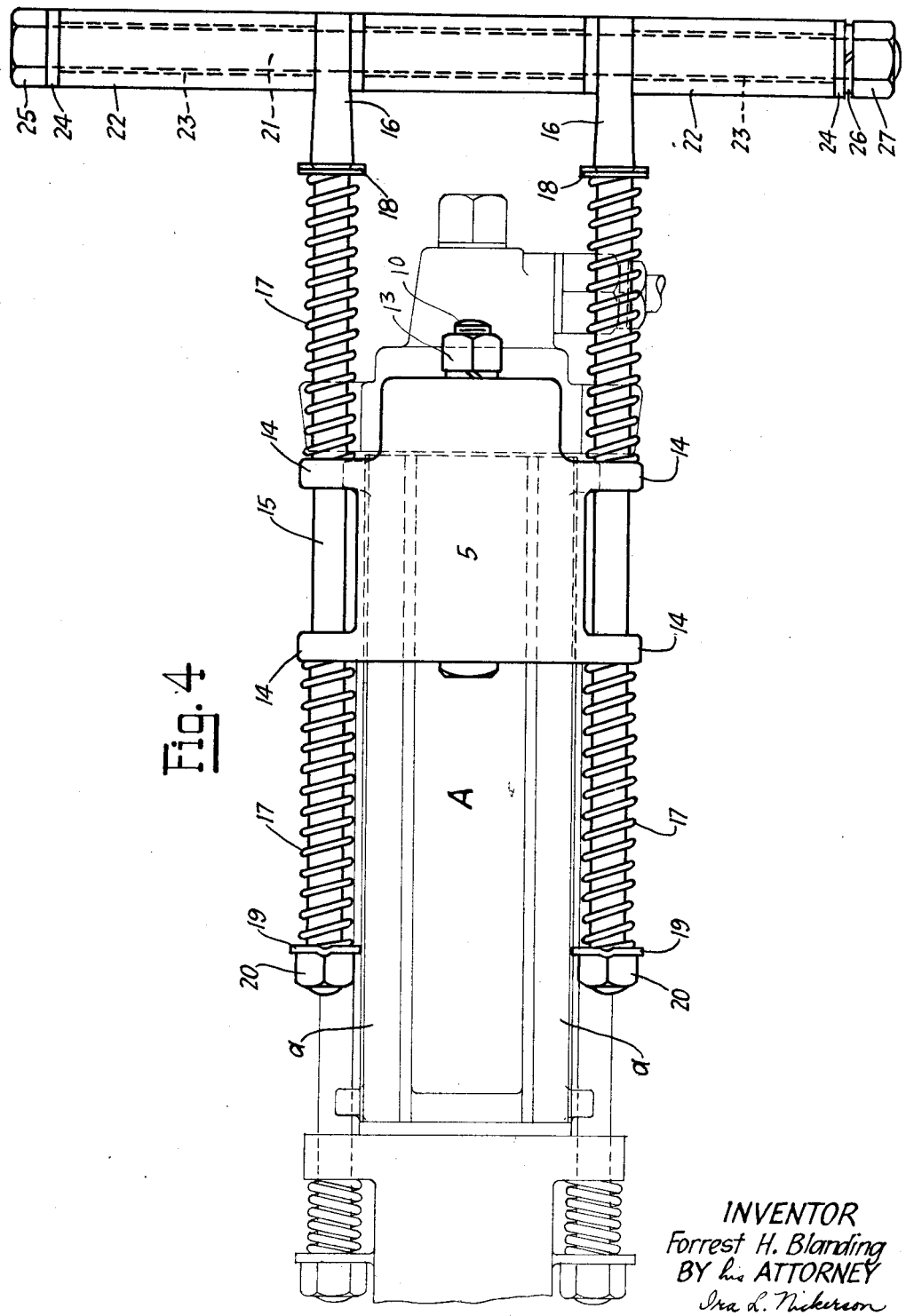

Patented Apr. 24, 1928.

1,667,280

UNITED STATES PATENT OFFICE.

FORREST H. BLANDING, OF DETROIT, MICHIGAN, ASSIGNOR TO CHICAGO PNEUMATIC TOOL COMPANY, OF NEW YORK, N. Y., A CORPORATION OF NEW JERSEY.

DETACHABLE HANDLE FOR DRILLS.

Application filed July 10, 1924. Serial No. 725,315.

This invention relates to handles for percussive tools of the type used in development work for drilling. It is particularly concerned with tools of this kind which are mounted upon some kind of a support, as a cradle or shell, and advanced mechanically to the work as by means of the ordinary feed screw.

A principal object of the invention is to provide a handle device which can be readily applied to the cylinder of a "drifter" or shell mounted drill to adapt the latter for use as a manually supported "sinker" drill. Another object is to provide the device with resilient means for relieving the operator of shocks incident to the operation of the drill when used as a hand supported tool. Another object is to increase the scope of utility of the mounted type of drill. A further object is to provide a device fitting and readily mounted on the shell mounting and feeding portions of the drill and disposing a handle in line with the longitudinal axis of the drill. Other objects will be apparent from the detailed description which follows.

In order to illustrate the invention and the manner of its use, one concrete embodiment thereof, at present considered the preferred form of the invention, is shown in the accompanying drawings, in which:

Fig. 1 is a side elevational view of the handle device secured to a percussive drill of the cradle or shell type;

Fig. 2 is a right end elevational view of the parts shown in Fig. 1;

Fig. 3 is a sectional view on the line 3—3 of Fig. 2; and

Fig. 4 is a bottom plan view of the parts shown in Fig. 1.

The embodiment of the invention chosen for the purpose of illustration comprises in its essential features a member or block 5 arranged to be secured to the percussive drill A which as shown is of the pressure fluid type having portions secured to or integral with the drill cylinder for cooperation with a shell mounting (not shown), such as the wings $a$ and the feed nut $a'$, and a handle 6 resiliently mounted on member 5 to permit the drill to be manually supported. The member or block 5 may be constructed and arranged to cooperate with the wings $a$ and feed nut $a'$ for which purpose block 5 has side portions provided with grooves 7 slidably receiving the wings $a$ and an end plate 8 forming an abutment for the feed nut (Fig. 3). The end plate has a perforation 9 in line with the bore of the feed nut $a'$ and through this perforation and the bore of the feed nut extends a bolt 10, the head of which with its washer 11 engages the end of the feed nut $a'$ opposite to that engaged by plate 8, a lock washer 12 and nut 13 serving to clamp plate 8 against the end of the lock nut $a'$ whereby the block 5 is securely and immovably clamped to drill A.

In order to resiliently mount handle 6 upon block 5, the latter may be provided with spaced aligned perforations, in the present instance formed in spaced pairs of perforated ears 14 projecting outwardly from those parts of block 5 having grooves 7. Through these perforations extend for sliding movement one or more rods 15, in the present instance two, having bent ends 16 to which handle 6 is secured, these bent ends serving to dispose the handle in line with the longitudinal axis or center line of the drill, as clearly illustrated in Figs. 1 and 2. Sliding movement of rods 15 within the perforations of ears 14 is yieldingly limited by coil springs 17 encircling the rods 15 on opposite sides of block 5, the spring 17 at the right of Fig. 1 being confined between the adjacent ear 14 and a stop 18 on the rod adjacent its bent end 16 and the spring 17 at the left of Fig. 1 being confined between its adjacent ear 14 and an abutment washer 19 backed by a nut 20 threaded on the end of rod 15. This construction permits limited yielding movement of the supporting rods 15 of handle 6 relative to block 5 and drill A axially in both directions and thus relieves the operator of shocks incident to the use and operation of the drill.

The handle may consist of a transversely disposed handle bolt 21 extending through perforations in the bent ends 16 of rods 15 and encircled by cylindrical members 22 of suitable material, such as rubber, forming grips and lined with steel tubes 23 which serve as spacers between the rod end 16 and the handle rod abutment washers 24 backed at one end by the head 25 of the bolt and at the other by lock washer 26 and nut 27.

In using the handle device the drill is detached from its shell mounting, the block 5 disposed with grooves 7 in line with wings $a$, whereupon the block is slid longitudinally of the drill until abutment plate 8 engages the end of the feed nut $a'$. The bolt 10 is then passed through the bore of the feed nut until its threaded end extends through the hole in plate 8, the lock washer 12 and nut 13 being then applied and the latter set up securely to fasten the block 5 to the drill. The latter is then ready for use as a hand supported tool. To reconvert the drill to the mounted type the above process is reversed.

From the above it will be apparent that the handle device of the present invention adapts the cradle or shell type of drill used in drifting to use as a manually supported drill such as is used for sinking thus reducing the amount of equipment needed in drilling operations and broadening the scope of utility of a drill of this character, that the handle device is easily attached and detached so that the drill can be quickly converted from shell mounted to hand supported use and vice versa, that the resilient mounting of the handle reduces the shock and strain incurred by the operator in using a heavy drill as a hand supported tool, and that the handle device is simple in construction, easy and cheap to manufacture and has no complicated or delicate parts which render it subject to breakage or interfere with its quick attachment and detachment.

While but one form of the invention has been herein shown and described it is to be understood that the invention is not limited to the specific features of construction shown but covers all modifications, adaptations and changes within the scope of the appended claims.

I claim:

1. The combination of a drill of the cradle or shell mounted type and a handle device detachably secured to the drill comprising a block having grooves receiving the projecting portions of the cradle or shell engaging parts of the drill with a sliding fit and applicable to and removable from the drill without disassembly of the latter, means for securing the block to the drill, and a handle attached to said block to adapt the drill for use as a manually supported tool.

2. The combination of a drill of the cradle or shell mounted type and a handle device detachably secured to the drill comprising a block having grooves receiving the projecting portions of the cradle or shell engaging parts of the drill with a sliding fit, means utilizing the feed nut projection of the drill for securing said block upon the drill, and a handle attached to said block to adapt the drill for use as a manually supported tool.

3. The combination of a drill of the cradle or shell mounted type and a handle device detachably secured to the drill comprising a block having grooves receiving the projecting portions of the cradle or shell engaging parts with a sliding fit, means securing said block against movement on the drill, and a handle attached to said block to adapt the drill for use as a manually supported tool.

4. The combination of a drill of the cradle or shell mounted type and a handle device detachably secured to the drill comprising a block having grooves receiving the projecting portions of the cradle or shell engaging parts with a sliding fit, said block having a stop plate abutting the feed nut projection of the drill, a bolt extending through the bore of said projection and an aligned hole in said plate to secure said block to the drill, and a handle attached to said block to adapt the drill for use as a manually supported tool.

5. The combination of a drill of the cradle or shell mounted type and a handle device detachably secured to the drill comprising a block having recesses receiving the projecting portions of the cradle or shell engaging parts, said block having a stop plate abutting the feed nut projection of the drill, a bolt extending through the bore of said projection and an aligned hole in said plate to secure said block to the drill, spaced parallel rods slidably mounted on said block for limited yielding movement in both directions, said rods being inwardly bent at one end, and a transverse handle secured to the bent ends of the rods and disposed thereby above and in line with the axial center of the drill.

6. The combination of a drill of the cradle or shell mounted type and a handle device detachably secured to the drill comprising a member removably secured to the drill, perforated ears on said member, a rod slidably received in the perforations of said ears, springs encircling said rod yieldingly to limit sliding movement of said rod relative to said member, and a handle on said rod to permit the drill to be manually supported.

7. The combination of a drill of the cradle or shell mounted type and a handle device detachably secured to the drill comprising a member removably secured to the cylinder of the drill, perforated ears on said member, spaced rods parallel with each other and with the axis of the drill slidable in the perforating of said ears, resilient means for limiting the sliding movement of said rods, and a handle secured to said rods to permit the drill to be manually supported.

8. The combination of a drill of the cradle or shell mounted type and a handle device detachably secured to the drill comprising a member removably secured to the cylinder of the drill, perforated ears on said member, spaced rods parallel with each other and with the axis of the drill slidable in the perforating of said ears, resilient means for limiting the sliding movement of said rods, and a handle secured to said rods to permit the drill to be manually supported, said rods having their handle ends inwardly bent to dispose the handle substantially in line with the axis of the drill.

9. A handle attachment for percussive drills of the cradle or shell mounted type comprising a block having grooves arranged to receive the projecting portions of the cradle or shell engaging parts of the drill with a sliding fit, means including a bolt arranged to engage the feed nut projection of the drill to secure the block upon a drill, and a handle attached to said block.

10. A handle attachment for percussive drills of the cradle or shell mounted type comprising a block having grooves arranged to receive the projecting portions of the cradle or shell engaging parts of the drill with a sliding fit and applicable to and removable from the drill without disassembling the latter, said block having an abutment portion disposed in the plane of the feed nut projection of the drill, means supported by said abutment portion for securing the block to the feed nut projection of the drill, and a handle secured to said block.

11. A handle attachment for percussive drills of the cradle or shell mounted type comprising a block arranged to be removably secured to the drill, pairs of aligned perforated ears on said block, rods extending through the perforations in said ears, said rods having similarly bent perforated ends, and a bolt provided with spacing grips extending through the perforated ends of said rods to form a handle.

12. A handle attachment for percussive drills of the cradle or shell mounted type comprising a member having recesses slidingly receiving the wing projections of the cradle mounting portion of the drill, an abutment to engage the feed nut of the drill, means to clamp said member to the engaged portion of the drill, and a spring handle secured to said member.

13. A handle attachment for percussive drills of the cradle or shell mounted type comprising a block having parts arranged slidingly to fit the cradle mounting portions of the drill, a perforated abutment plate to engage the feed nut, a bolt fitting the perforation in said plate arranged to extend through the bore of the feed nut of the drill to clamp said block thereto, and a spring handle secured to said member.

14. A handle attachment for percussive drills of the cradle or shell mounted type comprising a block having parts arranged slidingly to fit the cradle mounting portions of the drill, a perforated abutment plate to engage the feed nut, a bolt fitting the perforation in said plate arranged to extend through the bore of the feed nut of the drill to clamp said block thereto, and a handle resiliently mounted on said block extending rearwardly therefrom and offset relative thereto to dispose the same in line with the axis of the drill.

15. A handle attachment for percussive drills of the cradle or shell mounted type comprising a block having parts arranged slidingly to fit the cradle mounting portions of the drill, a perforated abutment plate to engage the feed nut, a bolt fitting the perforation in said plate arranged to extend through the bore of the feed nut of the drill to clamp said block thereto, said block having aligned perforations, slidable means cooperating with said perforations, resilient means associated with said slidable means yieldingly to limit the movement thereof, and a handle carried by said slidable means and disposed offset from said block to be in line with the longitudinal axis of the drill.

Signed by me at Detroit, Michigan this 7 day of July 1924.

FORREST H. BLANDING.